(12) United States Patent  
MacLaughlin et al.

(10) Patent No.: US 9,354,326 B2  
(45) Date of Patent: May 31, 2016

(54) LIQUID RESISTANT DIGITAL DETECTOR

(71) Applicant: Carestream Health, Inc., Rochester, NY (US)

(72) Inventors: Scott T. MacLaughlin, Rochester, NY (US); Robert J. Langley, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 27 days.

(21) Appl. No.: 14/308,981

(22) Filed: Jun. 19, 2014

(65) Prior Publication Data

US 2015/0008330 A1 Jan. 8, 2015

Related U.S. Application Data

(60) Provisional application No. 61/842,055, filed on Jul. 2, 2013.

(51) Int. Cl.
*G01T 1/00* (2006.01)
*G01T 1/24* (2006.01)
*B82Y 15/00* (2011.01)

(52) U.S. Cl.
CPC . *G01T 1/00* (2013.01); *G01T 1/244* (2013.01); *B82Y 15/00* (2013.01); *Y10S 977/954* (2013.01); *Y10T 29/49117* (2015.01)

(58) Field of Classification Search
CPC ............................. G01T 1/00; Y10S 977/954
See application file for complete search history.

(56) References Cited

U.S. PATENT DOCUMENTS

| 2002/0177767 | A1* | 11/2002 | Burton | A61B 5/0408 600/397 |
| 2006/0029808 | A1 | 2/2006 | Zhai et al. | |
| 2008/0149852 | A1* | 6/2008 | Shoji | B29C 66/82661 250/483.1 |
| 2010/0193672 | A1* | 8/2010 | Blasenheim | B01L 3/5027 250/234 |

* cited by examiner

*Primary Examiner* — David Porta
*Assistant Examiner* — Faye Boosalis

(57) ABSTRACT

A radiographic imaging detector has photoimaging pixels disposed in an array, control electronics for controlling operation of the array to capture radiographic images, and a voltage source for powering the array of photoimaging pixels and the control electronics. A housing with multiple parts encloses at least the array and the control electronics and provides a seating for the voltage source. A first part has a first mating surface, a second part has a second mating surface. The first and second mating surfaces are disposed adjacent to each other and define a gap therebetween with a hydrophobic material deposited along at least one of the first and second mating surfaces.

20 Claims, 10 Drawing Sheets

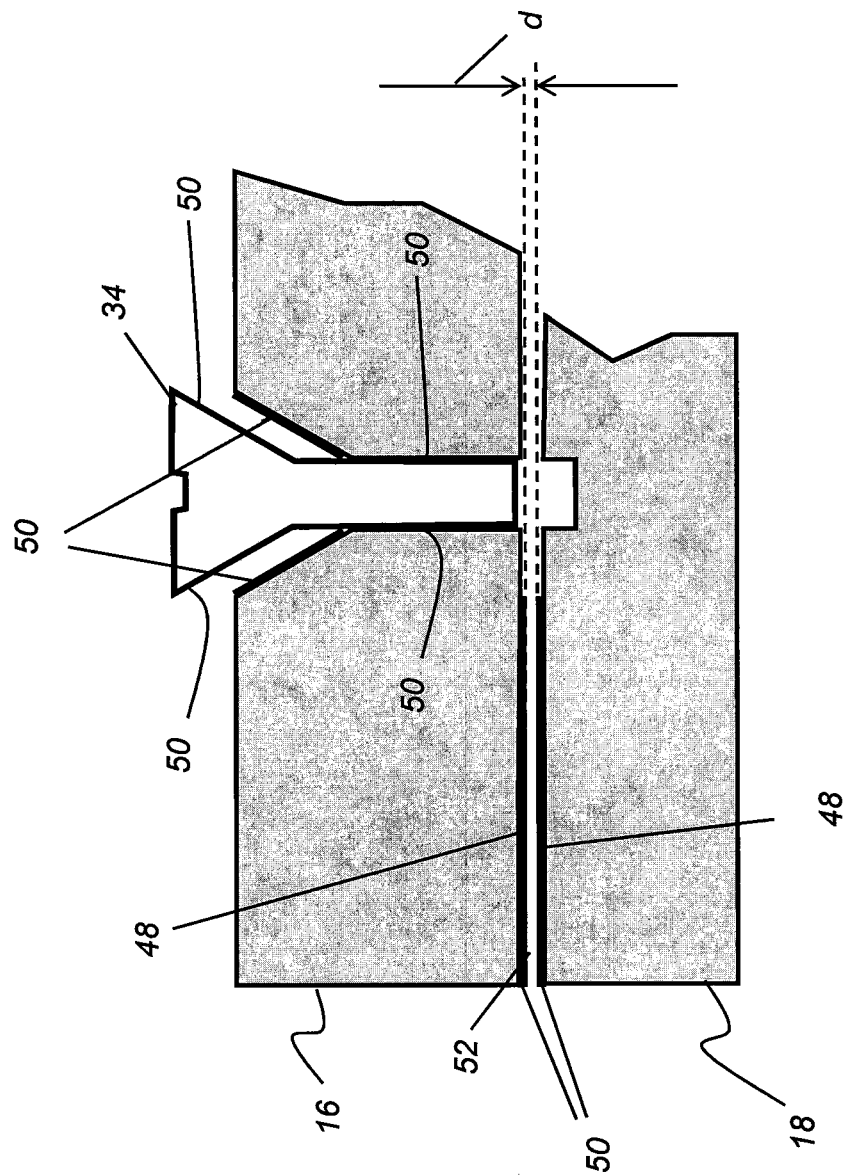

LIQUID RESISTANT DIGITAL DETECTOR

CROSS REFERENCE TO RELATED APPLICATIONS

This application claims priority to U.S. Patent Application Ser. No. 61/842,055, filed Jul. 2, 2013 and entitled WATERPROOFED DIGITAL DETECTOR, the entirety of which is incorporated herein by reference.

FIELD OF THE INVENTION

The invention relates generally to the field of medical imaging and more particularly relates to apparatus and methods for providing a portable wireless digital radiographic detector that is highly resistant to bodily liquids and moisture during normal handling and operation.

BACKGROUND

With the advent of portable wireless digital radiography (DR) detectors, hospitals and other healthcare facilities now have expanded capability for obtaining x-ray images, including images obtained at the patient bedside. Unlike conventional radiographic image detectors, the wireless DR detectors can be positioned about the patient in a number of positions, without the concern for extending wires between the detector and image acquisition and power electronics. Portability with wireless operation also makes these devices suitable for use in veterinary imaging, since the DR detector can be flexibly positioned and there are no external wires that could be chewed or otherwise damaged during handling and positioning about the animal subject. It is also possible to use the DR detector in various outdoor environments, under a range of weather conditions.

In conventional use as well as in veterinary, outdoor, and industrial and security imaging environments, however, the portable DR detector can be susceptible to ingress of bodily liquids, chemical liquids in the imaging area, and moisture. Even with careful sealing and liquid ingress prevention techniques, there still exists some risk to the detector if moisture or bodily fluids are able to seep into the housing interior and interfere with internal detector circuitry. To combat this problem, DR detector design may make use of a number of seals, o-rings, gaskets, and similar features intended to prevent moisture ingress. This adds cost and complexity to the mechanical design of the DR detector. Gasketed surfaces, for example, need to be meticulously ground and polished and mating surfaces must meet tight tolerances for uniformity, with a significant number of fasteners properly tightened in order that seals function properly. Reassembly requires considerable care in the event that the detector is disassembled for replacement of a battery or other component.

Encasement of the detector in a plastic envelope or other waterproof sleeve is a poor solution to the problem. Conventional liquid-tight sealing methods are also air-tight, sealing in heat and potentially causing an overheating condition that can degrade the life of electronic components and performance. In addition, some methods for obtaining a liquid-tight seal can compromise wireless signal transmission and reception.

Conventional liquid-proofing methods may be unsatisfactory solutions for a number of reasons. Gaskets and seals exhibit wear over time and their performance can be degraded by various factors, such as by disinfectant solutions and exposure to ultraviolet (UV) light, for example. Encasement of the detector within a container or envelope is not a suitable solution for every environment and would require constant replacement of the containment device. Standard sealant coatings would have a limited applicability and lifetime, subject to damage from scratching and abrasion. Moreover, a complete seal would not be feasible with many DR detectors, because there may be some type of input/output port provided for connecting data transfer wires, power cables, and connectors for other functions.

Levels of water resistance for electrical equipment and components are typically described by an IPX-rating, as defined in ANSI/IEC (American National Standards Institute/International Electrotechnical Commission) test specification ANSI/IEC 60529-2004 entitled "Degrees of Protection Provided by Enclosures". In the IPX rating system, a scale of values indicates relative protection from moisture, with higher values indicating correspondingly higher levels of protection. For example, a value of IPX-0 indicates virtually no protection from water. A value of IPX-4 indicates protection against splashing. A value of IPX-6 indicates protection against a high-pressure water stream. A value of IPX-8 indicates protection under continuous submersion. It can be appreciated that it would be beneficial to provide a high level of protection against liquid ingress for a DR detector, without adding significant cost, weight, or complexity to the device. At the same time, waterproofing and liquid proofing methods should have little or no impact on performance and functional requirements of the DR detector device related to sensitivity, image quality, interoperability, cooling, electrical connection, and component accessibility.

SUMMARY

An aspect of this application is to advance the art of medical digital radiography and to address, in whole or in part, at least the foregoing and other deficiencies of the related art.

It is another aspect of this application to provide in whole or in part, at least the advantages described herein.

Certain exemplary embodiments of the application address the need for a waterproofing solution that enables the portable DR detector to be used in environments where there may be liquids from the patient or other source that need to be restricted from entry into internal portions of the detector. Advantageously, embodiments of the application can eliminate at least some of the gasketing and sealing concerns for protecting the DR detector from liquid damage.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

According to one aspect of the disclosure, there is provided a radiographic imaging detector that includes first and second covers seating against each other along a mating surface when the imaging detector is assembled. A detector panel is disposed between the covers and a hydrophobic coating applied to at least the mating surface.

According to another aspect of the disclosure, there is provided a digital radiographic detector having a plurality of photoimaging pixels disposed in an array. Control electronics control operation of the array to capture radiographic images. A voltage source powers the array of photoimaging pixels and the control electronics. A housing encloses at least the array and the control electronics. The housing may provide seating for the voltage source. A first part of the housing comprises a first mating surface and a second part of the housing comprises a second mating surface. The mating surfaces are disposed adjacent to each other and define a gap therebetween wherein a hydrophobic material is deposited along at least one of the mating surfaces.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

FIG. 5A is an enlarged side view that shows a portion of mating surfaces and a fastener having a hydrophobic surface treatment.

DESCRIPTION OF EXEMPLARY EMBODIMENTS

Figure 1:
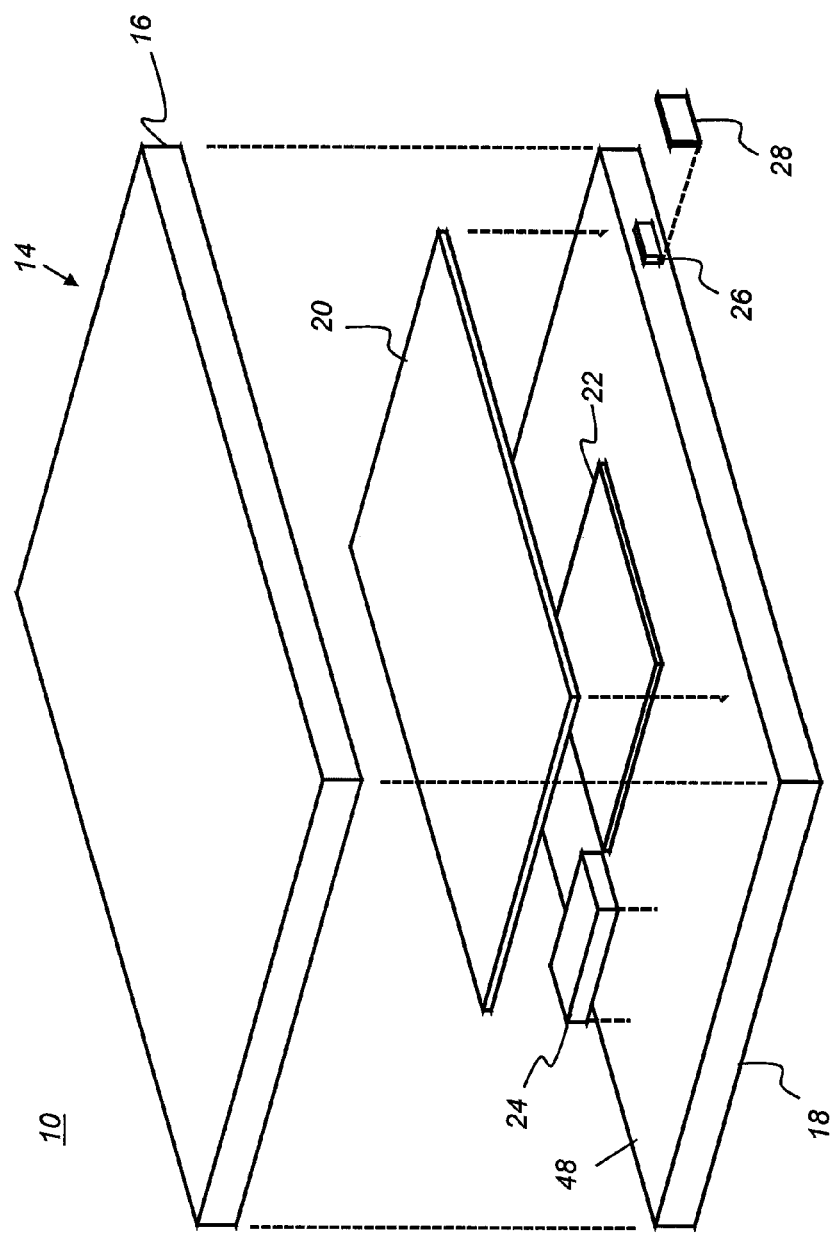
FIG. 1 is an exploded view that shows some of the components of a digital radiography (DR) detector.

The following is a description of exemplary embodiments, reference being made to the drawings in which the same reference numerals identify the same elements of structure in each of the several figures.

Where they are used in the present disclosure, the terms "first", "second", and so on, do not necessarily denote any ordinal, sequential, or priority relation, but are simply used to more clearly distinguish one element or set of elements from another, unless specified otherwise.

The exploded view of FIG. 1 shows, in simplified form, some of the electrically active internal components of a DR detector 10 that are protected within an enclosure or housing 14 formed using multiple parts, including top and bottom covers 16 and 18. A detector array 20 includes a scintillator and imaging pixels for capturing image signals from received radiation. A circuit board 22 provides supporting control electronics components for image data acquisition and wireless transmission to an external host system. A battery 24 provides power, acting as the voltage source for detector 10 operations. A port 26 extending through bottom cover 18 is provided to allow electrical connection for receiving and transmitting data, and/or receiving power such as from a voltage supply. The port may have an optional sealing cap 28, which may be a rubber seal or other liquid-proofing material. In addition to the illustrated components, a number of interconnecting cables, supporting fasteners, cushioning materials, connectors, and other elements may be used for packaging and protecting the DR detector circuitry. An optional antenna and transmitter for wireless communication may alternately be provided within or as part of the housing 14. Top and bottom housing covers 16 and 18 may be fastened together along a mating surface 48.

Figure 2:
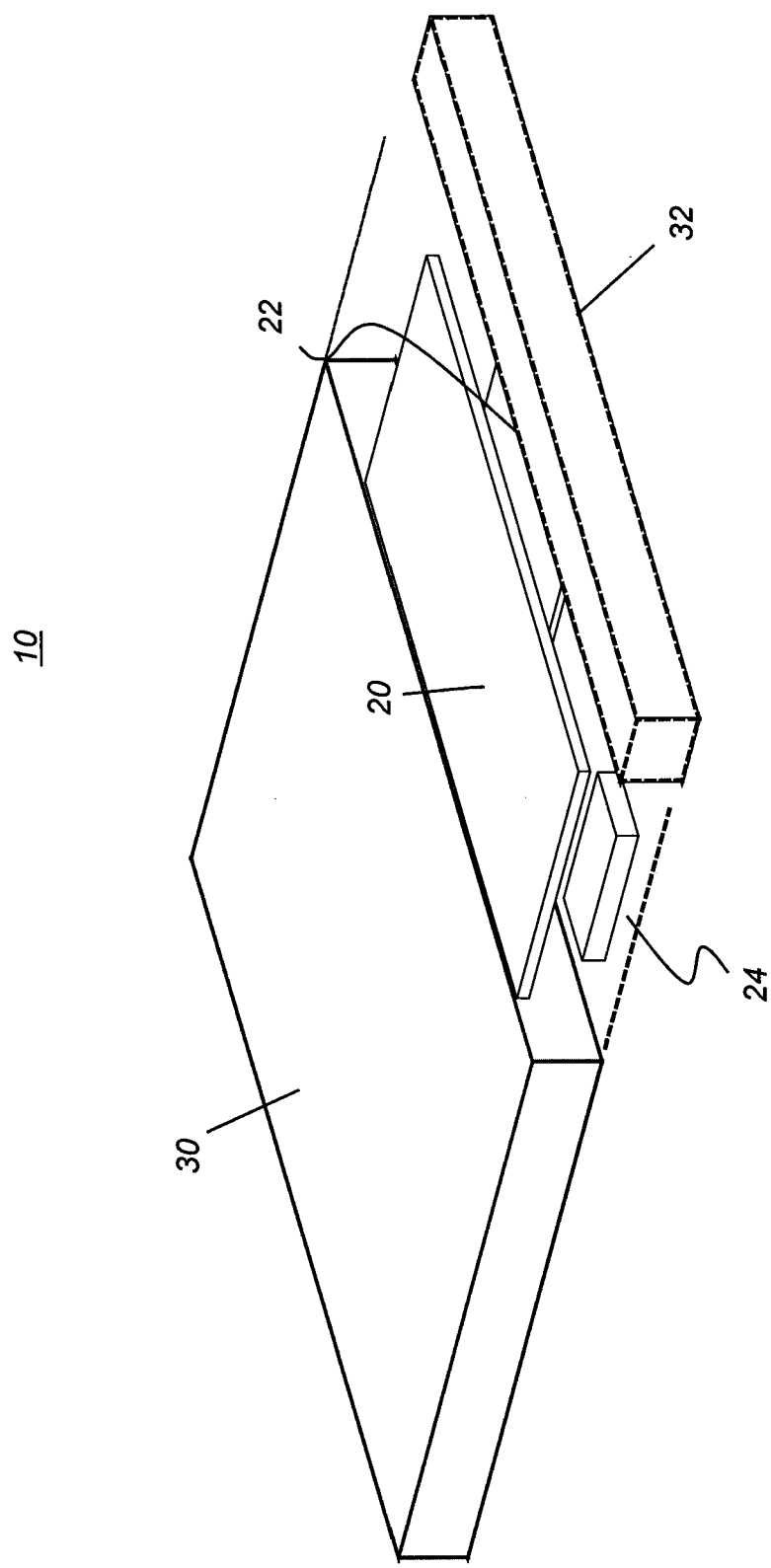
FIG. 2 is an exploded view that shows an alternate embodiment for DR detector packaging.

The exploded view of FIG. 2 shows an alternate embodiment of DR detector 10, in which detector array 20, circuit board 22, and battery 24, along with interconnection and other support components, slide into an encased cavity in an enclosure or housing 30 through an open end thereof. A lid 32 may be fastened to cover 30 to provide a protective seal.

Figure 3:
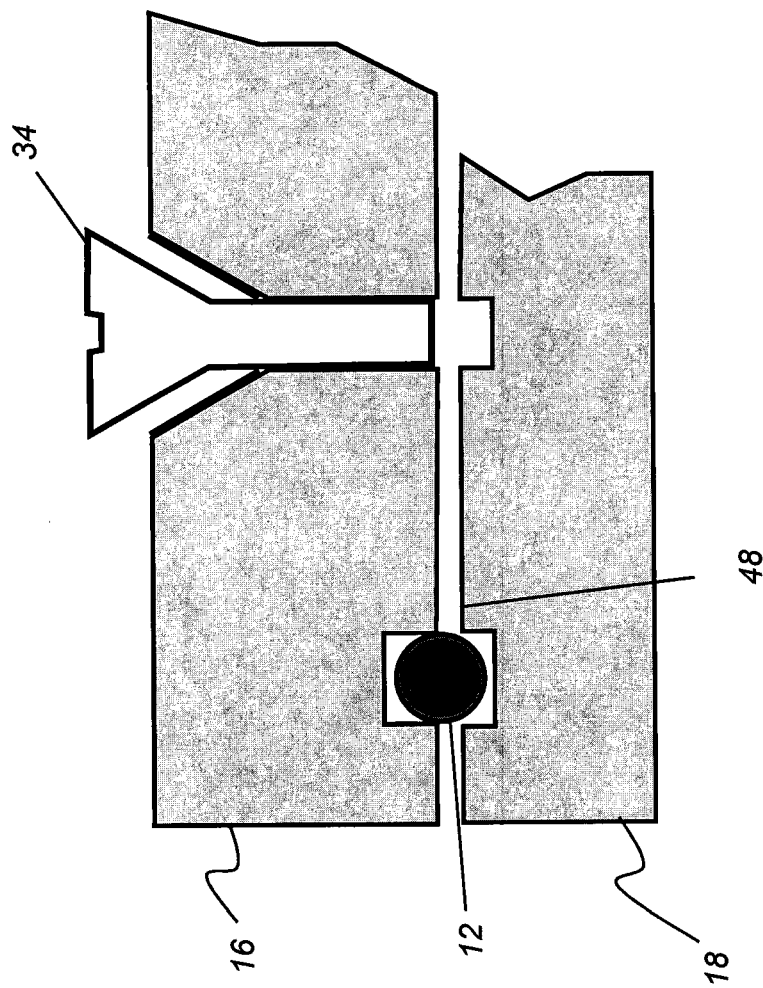
FIG. 3 is a side view that shows a conventional scheme for gasketing along mating surfaces and sealing of fasteners.

Moisture and other liquid ingress is a concern for either of the FIG. 1 or FIG. 2 embodiments. Typically, as shown in the partial side view of FIG. 3, a gasket or O-ring 12 is provided to fit within a groove along mating surface 48 between covers 16 and 18 of the enclosure or housing 14 of DR detector 10 as shown in FIG. 1 or, with the alternate embodiment of FIG. 2, along the mating surface where lid 32 joins cover 30. Fasteners 34, such as a screw for securing top 16 and bottom 18 covers, require secure mating connections to keep out moisture and other liquids. In order to properly seat O-rings or gaskets, mating surfaces 48 of covers 16 and 18 must be machined to a fine finish, with very low tolerances. It can be appreciated that, over time, some degradation of gaskets and seals is likely to occur, such as with standard handling of the detector, after disassembly for battery replacement or for firmware upgrade, or for other maintenance function, and with repeated connection and disconnection at port 26.

Embodiments of the present invention address the need for improved moisture protection of the DR detector using hydrophobic treatment of various surfaces and interfaces of the DR detector device enclosure. Hydrophobic surfaces provide an interface that is highly repellent to bodily fluids and water. On a hydrophobic surface, water and water-based liquids tend to bead rather than to spread across such a surface because the liquids are repelled by the surface. The hydrophobic surface is thus often described as having low "wettability".

Figure 4A:
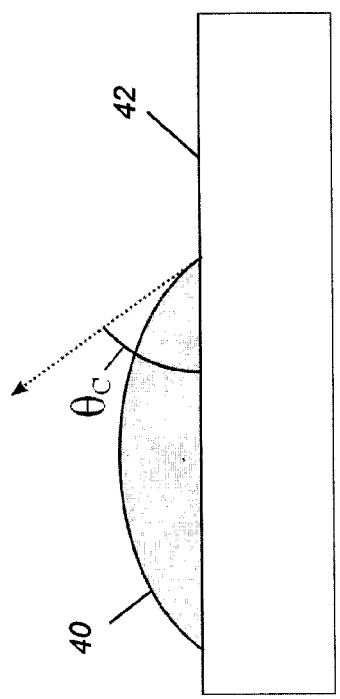
FIGS. 4A, 4B, 4C, and 4D show the droplet-surface interface having various contact angles.
Figure 4B:
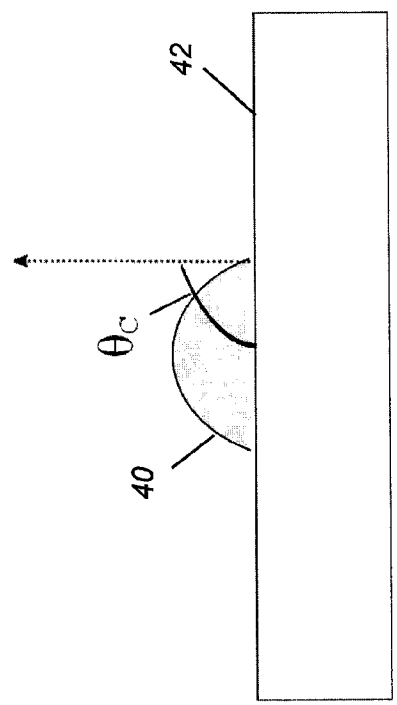
Figure 4C:
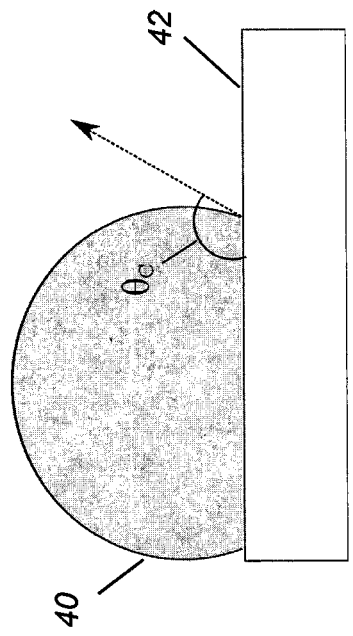
Figure 4D:
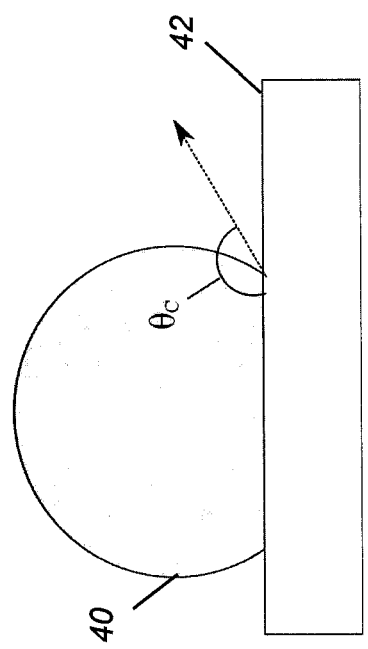

Hydrophobic behavior is quantified in terms of a contact angle $\theta c$ at the liquid/surface interface, based on a formula known as Young's equation. FIGS. 4A, 4B, 4C, and 4D illustrate, for a droplet 40 on a surface 42, how contact angle $\theta c$ is measured for an increasing hydrophobic property of the surface 42, from the relatively low contact angle $\theta c$ of FIG. 4A that is typical of most untreated surfaces along which water spreads freely, to the highly hydrophobic surfaces shown in FIGS. 4C and 4D, where the interface energy that relates to reduced wettability causes water to bead. By definition, hydrophobic behavior begins when the contact angle $\theta c$ of water is about 90 degrees, as shown in FIG. 4B. As a familiar point of reference, poly(tetrafluorethene) (PTFE, commercially provided as Teflon (R) material, a registered trademark of E. I. du Pont de Nemours and Company) has a water contact angle near 110 degrees. As the contact angle $\theta c$ increases toward 120 degrees, as shown in FIG. 4C, the wettability of the surface decreases due to its greater hydrophobic property. When hydrophobicity provides extreme contact angles $\theta c$ (such as that of a bird feather) in the superhydrophobic 150 degree contact angle example of FIG. 4D, the surface is considered to be highly resistant to the spread of moisture thereover.

Embodiments of the present invention use a hydrophobic coating or other treatment on selected surfaces of, and interfaces of, the DR detector 10 in order to prevent or significantly limit liquid ingress along mating surfaces, such as where top and bottom covers 16, 18 are adjacent or where they may partially abut or contact each other in some regions of the mating surfaces, and along connector interfaces. Where a hydrophobic treatment or a coating is used on one or both surfaces that define a gap in the housing that is defined between two covers or other components, the resulting hydrophobic property can be sufficient to keep water or other liquid from entering the DR detector through the gap. This can help to obviate the requirement for an additional gasket or sealant material to seal the gap. The need for precision adjustment and fitting of mating surfaces, mounting screws, and other hardware can also be significantly reduced.

Referring to FIG. 5A, mating covers 16 and 18 of the enclosure are treated with a hydrophobic coating 50 along one or more mating surfaces 48. In addition, screw holes and other features for accepting fasteners 34 are also conditioned with a suitable treatment such as coating 50. Optionally, fasteners 34 themselves may have an applied coating. With hydrophobic coatings that provide a contact angle in excess of about 100 degrees, a small airspace distance d in gap 52 may be tolerated between treated mating surfaces while still preventing ingress of liquids and moisture therethrough. A treated gap 52 with distance d smaller than about 0.010 to about 0.020 inches, or preferably smaller than about 0.005 in., for example, can be sufficient to prevent liquid flow between two treated surfaces or along the surfaces of screws or other fasteners that are fitted into orifices of the covers 16, 18. Components such as sealing cap 28 (FIG. 1) can be at least partially coated with a hydrophobic coating to obviate the need for seals or gasketing around electrical or data connectors.

Figure 5B:
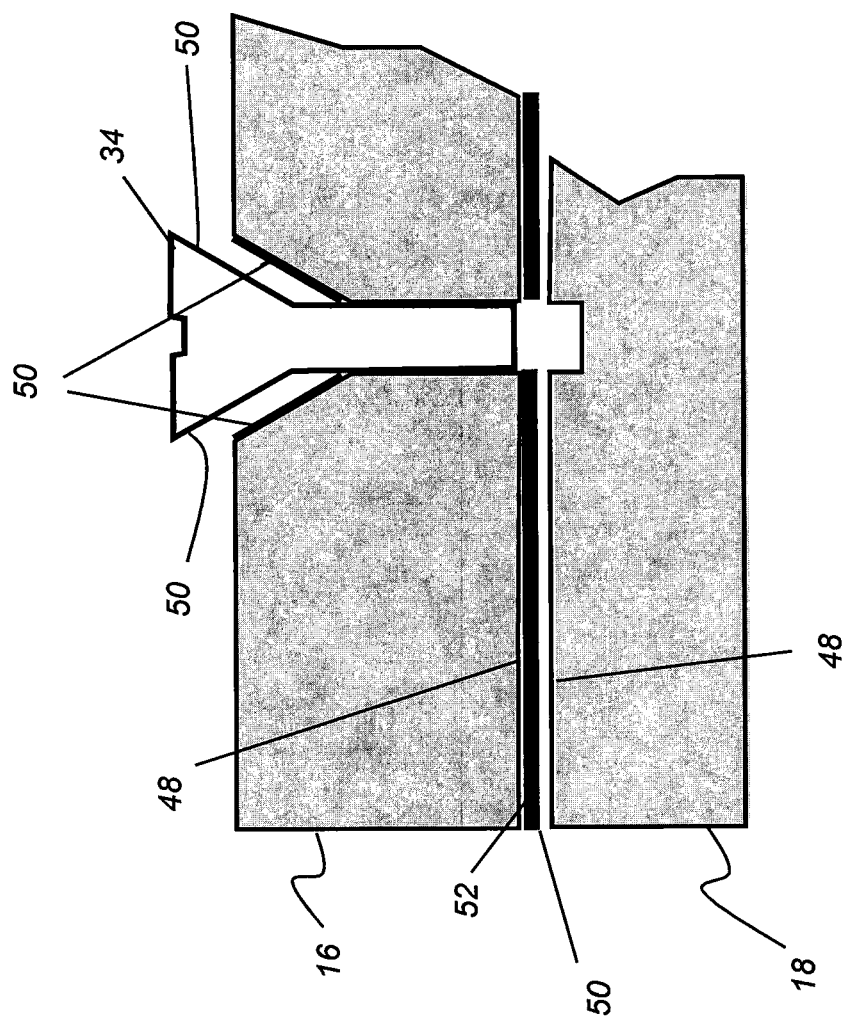
FIG. 5B is an enlarged side view that shows a portion of mating surfaces and a fastener, with a hydrophobic surface treatment applied to one of the mating surfaces.
Figure 5C:
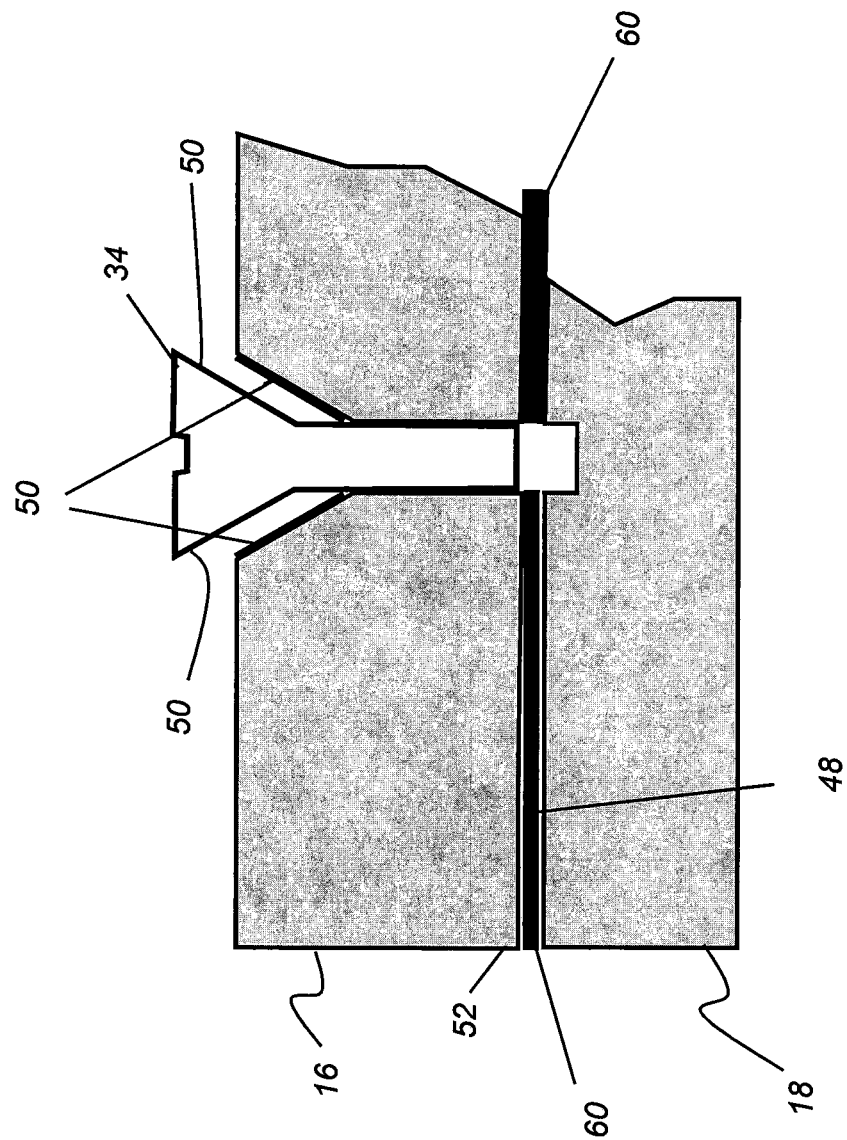
FIG. 5C is an enlarged side view that shows a portion of mating surfaces and a fastener, with a layer of hydrophobic material sandwiched between mating surfaces.

Other alternative arrangements for hydrophobic treatment of gap 52 are shown in FIGS. 5B and 5C. FIG. 5B is an enlarged side view that shows a portion of mating surfaces and a fastener, with a hydrophobic surface treatment applied to one of the mating surfaces. The mating surface 48 of cover 16 has an applied hydrophobic coating; cover 18 is not treated in the FIG. 5B example. Using fastener 34, which may include a machine screw, for example, gap 52 can be kept small enough that fluid ingress through gap 52 is prevented.

A pre-formed hydrophobic film, gasket, or other hydrophobic material can alternately be pressed within the gap between cover portions. FIG. 5C is an enlarged side view that shows a portion of mating surfaces and a fastener, with a layer 60 of hydrophobic material sandwiched between mating surfaces. Layer 60 can be applied in partially cured form or have an adhesive backing or may be conditioned and inserted to adhere to either or both mating surfaces 48, effectively forming a coated surface under compressive force exerted by tightening fastener 34.

One advantage of hydrophobic coatings for waterproofing gaps relates to air flow, such as for cooling or venting. Using conventional gasket and sealing techniques, both air/gas and liquid flow across the interface are constrained. However, using conventional machining practices and following close tolerances, a selected coating thickness, positioned within air passages or passages or vents for other gases can be liquid-proofed and yet allow air passage without requiring air-tight sealing. Thus, for example, the use of hydrophobic coatings can allow venting of the DR detector battery 24 (FIGS. 1 and 2) using small sized orifices for air passage, while keeping out liquid and/or moisture at the same time.

In one embodiment, hydrophobic coated surfaces (e.g., mating surfaces) can provide air passages or conduits (e.g., internal, or internal extending to an exterior surface) for the DR detector 10 that can block liquid (e.g., liquid-proof) yet allow gases to pass therethrough (e.g., not air-tight).

A number of hydrophobic coating materials use nanoparticles, which, by definition, are generally between 1 and 100 nm in diameter, in various arrangements. Some of the nanoparticle-based hydrophobic coatings can exhibit contact angles in a range of 120 degrees or more. Superhydrophobic materials can have contact angles of 150 degrees or more. A contact angle in excess of 150 degrees provides a hydrophobic treatment that is particularly advantageous for the DR detector. A contact angle in excess of 120 degrees can also provide good performance. A contact angle in excess of about 100 degrees provides a measure of protection but may constrain allowable tolerances related to gap distance of the housing. The choice of a particular material to be applied as a hydrophobic treatment depends on factors such as a selected design tolerance between mating surfaces. A number of types of hydrophobic materials are applied under high energy conditions, such as using plasma-assisted deposition under vacuum for various carbon-based materials, such as materials formed from carbon nanotubes, for example. Coatings can be applied to covers 16 and 18 or to individual components of housing 14 separately, to selected portions or surfaces thereof, or to the assembled DR detector 10 in order to render the assembled DR detector 10 hydrophobic.

Hydrophobic materials that can be used as coatings include polysiloxanes and other organosilicon polymers, poly(tetrafluorethene) (PTFE) or polypropylene (PP); coatings formed from reactive inorganic nanoparticles; compositions that comprise a plurality of nano-fillers dispersed within a fluoroelastomer matrix; compositions with a nano-filler having a core-shell structure with a silica shell over a metal oxide core; multilayered film coatings such as the polyelectrolyte layers described in US Patent Application Publication No. 2006/0029808 A1 entitled "Superhydrophobic coatings" by Zhai et al., which is incorporated by reference herein in its entirety; sol-gel foam coatings, and sol-gel alumina coatings.

Nano-fillers used within the hydrophobic material can have any of a variety of structures, including nanospheres, nanotubes, nanofibers, nanoshafts, nanopillars, nanowires, nanorods, nanoneedles, and nanowhiskers, for example. Coatings formed using nanoparticles appear to be particularly promising, since a number of coatings of this type provide treated hydrophobic surfaces with high water repellent contact angles, with some materials exceeding 120 degrees.

A variety of deposition techniques can be used to provide exemplary embodiments of hydrophobic coatings on components and/or surfaces of the DR detector 10. Coating methods can include spin-coating, dip-coating, brush or roller application, gap coating, extrusion coating, aerosol spraying, ink jet printing, and doctor blade-casting, in which the coating solution is deposited on a substrate and a straight edge then used to spread the solution. For a number of coating types, the coating or a precursor is applied using a vacuum chamber. Application steps for many of these coating techniques can include baking, sintering, and other methods for curing or otherwise conditioning the applied coating. Application may require one or more base coatings including an adhesion promoting resin to pre-condition the surface, followed by one or more applications of the hydrophobic material itself. Various curing agents can be incorporated in the nanoparticle formulation, including monomer and fluoroelastomer materials, for example. The surface of interest may also be plasma treated, which may help to remove organic contamination and increase surface reactivity. Plasma treatment can include air plasma, oxygen plasma, or carbon dioxide plasma, for example.

Advantageously, the use of nanotechnology and coatings with substantial nanoparticulate content can reduce the weight of the DR detector and can help to eliminate at least a portion of seals, gaskets, and other preventive devices and treatments that have previously been used for protection of DR detectors from liquids. These coatings can withstand heat, cleaning, and abrasion, and allow disassembly of the DR detector, such as for battery replacement, upgrade, or repair, for example. In one embodiment, hydrophobic coatings can be re-applied to selected surfaces of the housing or to the detector or detector components. For example, hydrophobic coatings can be repeatedly or periodically applied to help renew water repellent behavior, such as when the detector is disassembled for service or battery replacement.

While coatings that are hydrophobic can be particularly useful with DR detectors, these coatings can also be-used for properly designed film or computed radiography (CR) cassettes that use a removable medium that is developed, scanned, or otherwise processed to obtain image data following exposure.

The applied hydrophobic material can include any of a number of solvents to help disperse the nanoparticles or other components along the surface to be treated. Solvents can include water or organic solvents, such as methyl isobutyl keytone, acetone, methyl ethyl ketone, and other solvent materials.

The DR detector covers 16 and 18 (FIG. 1) may be metal, such as aluminum, magnesium or their alloys, or some other metal or metal alloy; alternatively, one or both covers 16 and 18 can be a composite material, such as a plastic or carbon fiber material. The area of concern for moisture ingress into the housing is at the interface between the covers 16 and 18, where gap 52 has been described herein; the covers 16, 18 themselves are impervious to moisture and may not require hydrophobic treatment except near the gap 52. By hydrophobic treatment of areas adjacent to gap 52, embodiments of the present disclosure reduce or eliminate the need for gaskets, o-rings, seals, and sealants as features for keeping moisture from seeping into the DR detector. Hydrophobic treatment can also allow relaxed mechanical tolerances for covers, particularly with respect to mating surfaces. This, in turn, reduces or eliminates machining costs and may allow the use of cast or molded plastic or composite materials for covers, instead of requiring more costly metal materials.

Figure 6B:
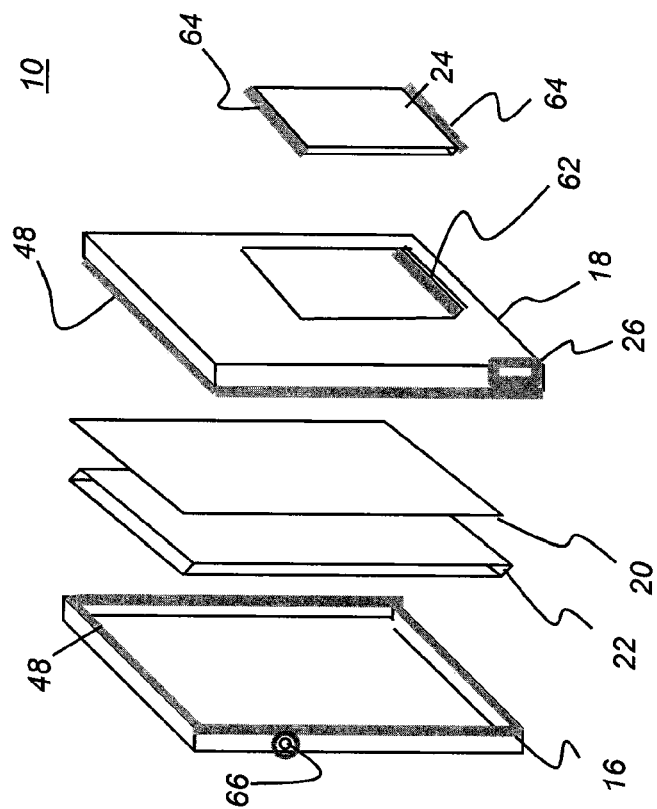
FIG. 6B shows a number of surfaces and interfaces of the DR detector that have hydrophobic treatment.
Figure 6A:
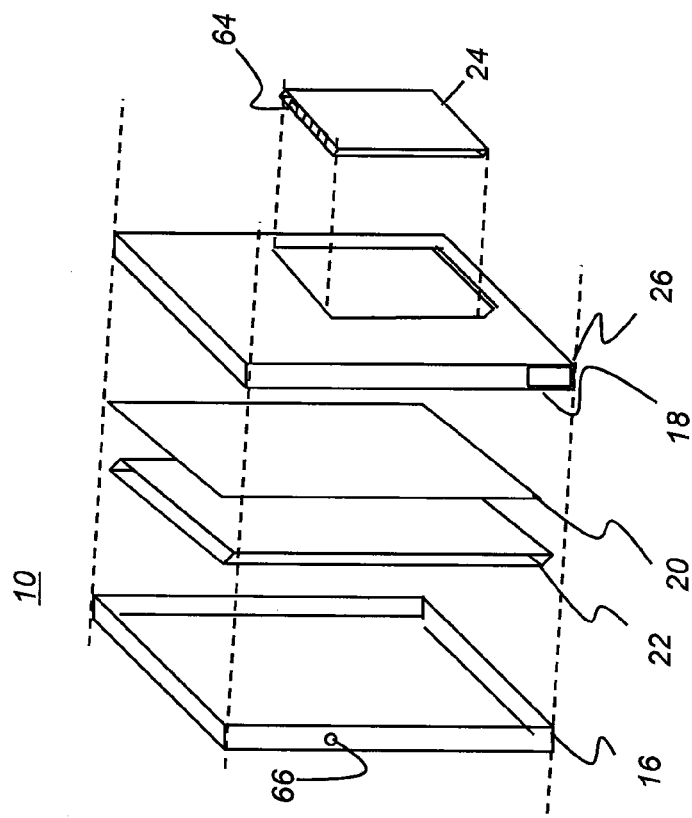
FIG. 6A is an exploded view that shows some of the components of a DR detector according to an embodiment of the present disclosure.

According to an exemplary embodiment of the present disclosure, as shown in the partial exploded view of FIG. 6A, a DR detector 10 may have a number of parts, including covers 16 and 18, for protecting the photoimaging detector array 20 and control electronics of circuit board 22. Battery 24 may be removably mounted against the outside of cover 18. Battery 24 may be seated against one of covers 16 and 18 and may be held in place by a clamp or other suitable fastener (not shown).

FIG. 6B shows a number of surfaces and interfaces of the DR detector of FIG. 6A that have hydrophobic treatment. The treated surfaces are highlighted in FIG. 6B, using expanded lines. Treated areas can include: mating surfaces 48 of covers 16 and 18; exposed portions of port 26 and along the periphery of this connection port; along a connector interface 62 for battery 24; and within and along vent orifices 64 that are located along one or more edges of battery 24. One or more optional vent orifices 66 can also be provided in detector housing 14.

In an exemplary embodiment of the present disclosure, the hydrophobic treatment that is used is applied in a multi-stage process, using dipping where practicable, in order to achieve full coverage of the highlighted areas. First, a base coat is applied in one or more applications. Dry time between base coat applications at room temperature is on the order of about 15 minutes.

The base coat provides a suitable adhesive that conditions the treated area for better adhesion of the top coat. The top coating layer, applied to surfaces treated with the base coat, can be added in one or more applications.

The top coating layer includes a nanoparticle-based hydrophobic material that is capable of providing superhydrophobic performance, with contact angles of up to 165 degrees. With contact angles in this range, vent openings of small enough diameter, such as less than about 0.020 in. diameter, are able to allow cooling air flow or allow exhaust gas passage, while at the same time fluid ingress through the same orifices is blocked. Advantageously, the hydrophobic treatment can be applied at the parts fabrication stage, such as just after covers 16 and 18 are machined or molded and before they are used to form housing 14, rather than following later stages of DR detector assembly.

Figure 6C:
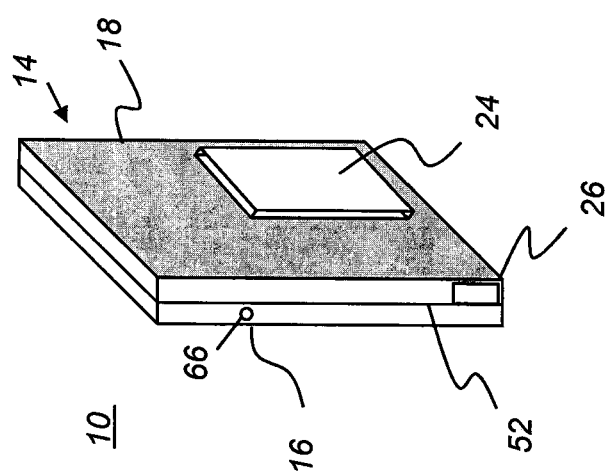
FIG. 6C shows the assembled DR detector of FIGS. 6A and 6B.

FIG. 6C shows the assembled DR detector of FIGS. 6A and 6B, with battery 24 fitted into position against the housing 14. It can be appreciated that the fluid protection approach that is used in embodiments of the present disclosure has advantages over conventional gasketing and sealing techniques. The treated areas are along interfaces that offer some measure of protection against abrasion and damage, rather than extending across broad areas where a coating or other hydrophobic treatment could easily be scratched or worn away. Venting areas are unobstructed to gases but block water and other fluids. Disassembly and re-assembly can be performed without requiring renewal of the hydrophobic treatment. If necessary to remove and renew the treatment, mild solvents such as mineral spirits or xylene can be used, with light abrasion, to restore the original surface of the housing components preparatory to re-application. Advantageously, the base coating and hydrophobic top coating can be reapplied to mating and connector surfaces without requiring separate high-energy application or vacuum equipment.

As noted previously, there are a number of different materials that can be used for providing hydrophobic behavior along mating surfaces between parts of the DR detector housing and along electrical contacts, signal ports, and ventilation orifices. There are, similarly, a number of different application technologies and methods that can be used for depositing hydrophobic materials at suitable locations along mating surfaces and interfaces for providing increased protection from moisture ingress.

Electrical contacts for data signals or power signal connection can also be provided with hydrophobic treatment, along and adjacent to the point of contact. Hydrophobic treatment can be used with various types of pin connectors, including connections that employ spring-loaded pins that require only a minimal contact area between conductors.

Embodiments of the application provide a radiographic imaging detector including: a first cover; a second cover that seats against the first cover along a mating surface when the imaging detector is assembled; a detector panel that lies between the first and second cover; and a hydrophobic coating applied to at least one mating surface. The radiographic imaging detector may further comprise an input/output port that is accessible within at least one of the first and second covers; a removable cover plate that seals against the input/output port, wherein at least one of the cover plate or an edge of the input/output port further have the applied hydrophobic coating. The radiographic imaging detector may further comprise one or more fasteners that have an applied hydrophobic coating. The applied hydrophobic coating can be formed from carbon-based nanoparticles and can also be applied to one or more fasteners of the imaging detector. The coating can be applied to both the first and a second mating surface that seats against the first mating surface. The detector panel may alternately house a computed radiography or a film medium.

The hydrophobic coated mating surface of the digital radiographic detector 10 is liquid-proof and not air-tight between the first cover and the second cover.

Embodiments of the present invention provide a method for fabricating a digital radiography detector, the method comprising conditioning mating surfaces of first and second housing covers by applying one or more coating materials under vacuum; and fastening the first and second housing covers wherein a gap between the first and second housing covers is greater than about 0.005 and less than about 0.020 inches when the digital radiography detector is assembled. The one or more coating materials may comprise carbon nanotubes.

The invention has been described in detail, and may have been described with particular reference to a suitable or presently preferred embodiment, but it will be understood that variations and modifications can be effected within the spirit and scope of the invention. In addition, while a feature(s) of the invention can have been disclosed with respect to only one of several implementations/embodiments, such feature can be combined with one or more other features of other implementations/embodiments as can be desired and/or advantageous for any given or identifiable function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A digital radiographic detector comprising:
a plurality of photoimaging pixels disposed in an array;
a scintillator over the photoimaging pixels;
control electronics for controlling operation of the array to capture radiographic images;
a voltage source for powering the array of photoimaging pixels and the control electronics; and
a housing comprising a plurality of parts,
wherein the housing encloses at least the array, the scintillator, and the control electronics when the plurality of parts are assembled together,
a first one of the plurality of parts comprises a first mating surface,
a second one of the plurality of parts comprises a second mating surface,
the first and second mating surfaces are adjacent and face each other when the plurality of parts are assembled together, and
wherein a hydrophobic material is deposited on at least one of the first and second mating surfaces.

2. The digital detector of claim 1, wherein the plurality of parts are made from a metal alloy.

3. The digital detector of claim 2, wherein the first and second mating surfaces at least partially abut and provide a liquid tight seal, wherein the liquid tight seal is not air tight.

4. The digital detector of claim 3, wherein the first and second mating surfaces are spatially separated at least in some regions, the spatially separated regions of the first and second mating surfaces defining a gap less than about 0.020 inches.

5. The digital detector of claim 4, wherein the gap is less than about 0.005 inches.

6. The digital detector of claim 1, wherein one of the plurality of parts comprises a housing opening for receiving a connector, the housing opening and the connector configured such that the housing opening can be sealed using a cap having a coating made from a hydrophobic material.

7. The digital detector of claim 1, wherein the hydrophobic material comprises multiple layers of a polyelectrolyte.

8. The digital detector of claim 1, wherein the hydrophobic material provides a contact angle in excess of about 120 degrees.

9. The digital detector of claim 1, wherein the hydrophobic material comprises a material selected from the group consisting of polysiloxanes, organosilicon polymers, poly(tetrafluorethene), polypropylene (PP), reactive inorganic nanoparticles, compositions of nano-fillers dispersed within a fluoroelastomer matrix, compositions with a nano-filler having a core-shell structure with a silica shell over a metal oxide core, sol-gel foam, sol-gel alumina, and multilayered film coatings.

10. A digital radiographic detector comprising:
a plurality of photoimaging pixels disposed in an array;
control electronics for controlling operation of the array to capture radiographic images;
a voltage source for powering the array of photoimaging pixels and the control electronics; and
a housing comprising a plurality of parts,
wherein the housing encloses at least the array and the control electronics,
a first one of the plurality of parts comprises a first mating surface,
a second one of the plurality of parts comprises a second mating surface,
the first and second mating surfaces face each other,
wherein a hydrophobic material is deposited on at least one of the first and second mating surfaces, and
wherein at least one of the plurality of parts comprises a fastener opening for a fastener to be inserted therethrough and to fasten together the plurality of parts, and wherein the fastener opening is coated with the hydrophobic material.

11. The digital detector of claim 10, wherein the fastener is configured to tighten the first and second mating surfaces against each other when the fastener is tightened.

12. A method of assembling a digital radiographic detector, the method comprising:
assembling internal components of the digital radiographic detector, the internal components comprising at least an array of photoimaging pixels, a scintillaor over the photoimaging pixels, and electronics circuits;
applying a hydrophobic material to a first portion of a first housing part; and
attaching the first housing part to a second housing part such that the first portion of the first housing part is adjacent to and faces a second portion of the second housing part, and the attached first and second housing parts form an enclosure surrounding the assembled internal components.

13. The method of claim 12, further comprising at least partially abutting the first portion of the first housing part against the second portion of the second housing part.

14. The method of claim 13, further comprising attaching the first housing part to the second housing part such that the first portion of the first housing part is within a gap of about 0.005 inches to about 0.02 inches from the second portion of the second housing part, including providing a liquid tight seal in the gap but not an air tight seal in the gap.

15. The method of claim 12, further comprising coating at least a portion of a sealing cap with the hydrophobic material and covering a connector port in at least one of the housing parts with the sealing cap.

16. The method of claim 12, further comprising depositing the hydrophobic material within at least one ventilation orifice in the first housing part to form a liquid tight ventilation orifice.

17. The method of claim 12, wherein the step of applying comprises aerosol spraying the applied hydrophobic material.

18. A method of assembling a digital radiographic detector, the method comprising:
   assembling internal components of the digital radiographic detector, the internal components comprising at least an array of photoimaging pixels and electronics circuits;
   applying a hydrophobic material to a first portion of a first housing part;
   attaching the first housing part to a second housing part such that the first portion of the first housing part faces a second portion of the second housing part and the first and second housing parts form an enclosure surrounding the assembled internal components;
   forming a fastener opening in the first housing part; and
   applying the hydrophobic material to the fastener opening,
   wherein the step of attaching comprises inserting a fastener through the fastener opening and coupling the fastener to the second housing part such that the fastener is secured against the hydrophobic material applied to the fastener opening.

19. The method of claim 18, further comprising screwing the fastener into the second housing part.

20. A method of assembling a digital radiographic detector, the method comprising:
   assembling internal components of the digital radiographic detector, the internal components comprising at least an array of photoimaging pixels and electronics circuits;
   applying a hydrophobic material to a first portion of a first housing part;
   attaching the first housing part to a second housing part such that the first portion of the first housing part faces a second portion of the second housing part and the first and second housing parts form an enclosure surrounding the assembled internal components; and
   applying the hydrophobic material to the second portion of the second housing part.

\* \* \* \* \*